June 1, 1926.
W. H. HERRICK
CHILD'S COMBINATION WAGON
Filed Sept. 10, 1924
1,586,624
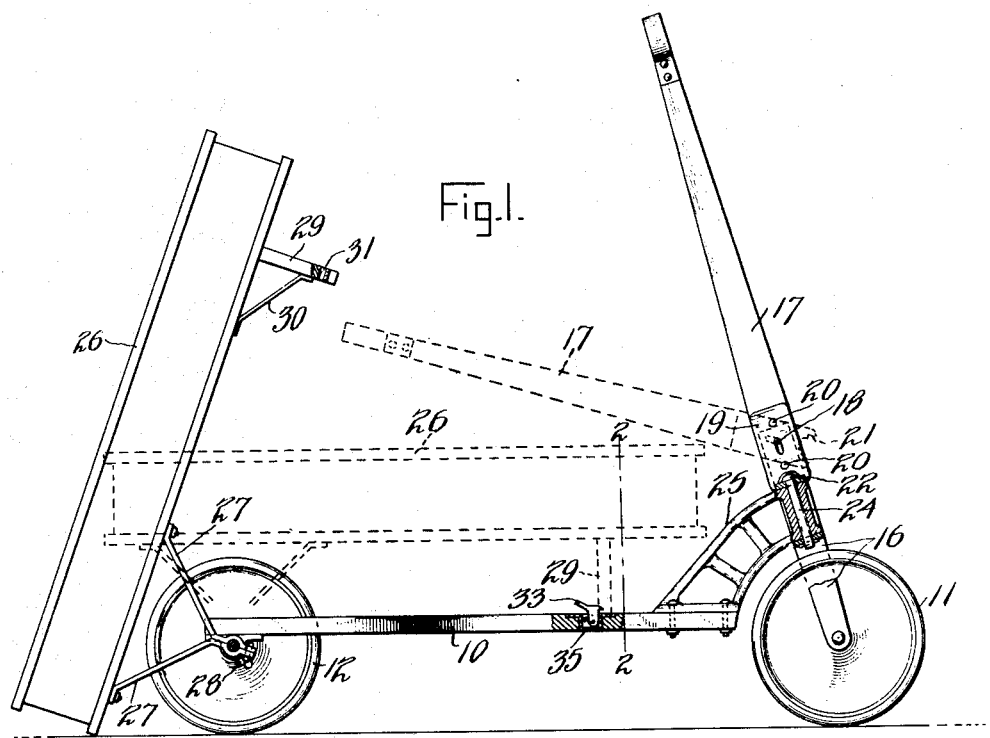
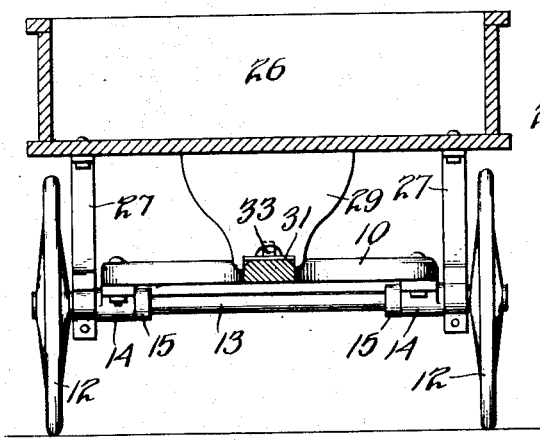
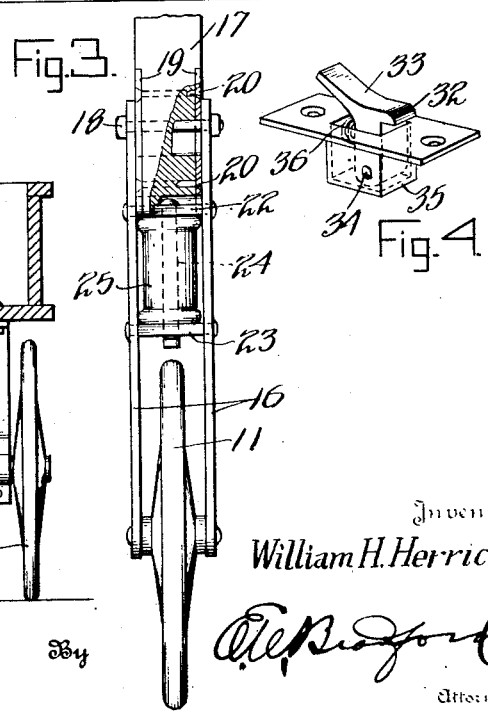
Inventor
William H. Herrick
By
Attorney Patented June 1, 1926.

1,586,624

UNITED STATES PATENT OFFICE.

WILLIAM H. HERRICK, OF INDIANAPOLIS, INDIANA.

CHILD'S COMBINATION WAGON.

Application filed September 10, 1924. Serial No. 736,985.

My said invention relates to a child's combination wagon which unites in a single structure devices commonly known as a scooter, a dump wagon and a coaster.

Referring to the accompanying drawings which are made a part hereof and on which similar reference characters indicate similar parts,—

Figure 1 is a side elevation of my device,
Figure 2, a vertical section on line 2—2 of Figure 1,
Figure 3, an enlarged detail of the steering post partly in section at right angles to Figure 1, and
Figure 4, an enlarged detail of a detent forming a part of the construction.

In the drawings reference character 10 indicates the body of a scooter which may be substantially of any ordinary known construction, this scooter being provided with a front wheel 11 and rear wheels 12. The rear wheels are mounted on an axle 13 to which the body is secured by brackets 14 in which the axle is journaled or fixed as may be preferred, a pair of collars 15 being provided on the axle to prevent endwise play of the axle in its bearings.

At the front end of the body there is a steering post comprising lower forks straddling the wheel 11, which forks support between them an upper part 17 pivoted at 18 on a pivot pin passing through the upper part of the forks 16 and through reenforcing plates 19 at each side of the upper part 17 hereinafter referred to for convenience as the steering post. A pair of rivets 20 fasten the plates 19 to the post 17 and to each other.

The post 17 is cut away at its lower end to form a pair of opposed shoulders 21 engaging over a plate 22 which has reduced ends passing through openings in the forks 16 to which it is riveted or otherwise secured. The post 17 has a slot in which the pivot 18 is located so that the post may be lifted to disengage the forks 21 from the plate 22 whereupon the post may be moved back into the dotted line position of Figure 1.

Below the plate 22 another plate 23 is secured to the forks 16 in a similar manner and an upright pin 24 passes through said plates to secure the post pivotally to a bracket 25 fixed to the front end of the body 10.

A wagon body 26 is provided with pairs of brackets 27 at its rear end said brackets having their mating lower ends shaped to fit about the axle 13 and being provided with thumb screws 28 by which said lower ends may be held together when the device is to be used as a coaster wagon or a dump wagon. Near the forward end of the body is a depending bracket 29 held in place by a brace 30 and having at its lower end a hole or recess 31 adapted to receive the forward end 32 of a detent 33 pivoted at 34 in a casting or stamping 35 adapted to be seated in a depression in the body 10 where it is fastened by screws or other suitable means. The pawl is normally pressed forward by a spring 36.

In the use of my device the body may be removed by backing off the screws 28 and releasing the detent 33 whereupon the device can be used as a scooter. If it is to be used as a dump wagon the body is replaced with the detent engaging the bracket 29, the post 17 being lifted to disengage it and being then tilted forward or being left in the upright position of Figure 1. If it is desired to use the device as a coaster wagon the upper part of the post 17 is disengaged and tilted back into the position shown in dotted lines in Figure 1, the body of the device being also in the dotted line position indicated.

It will be obvious to those skilled in the art that various changes may be made in my device without departing from the spirit of the invention and therefore I do not limit myself to what is shown in the drawings and described in the specification but only as indicated in the appended claims.

Having thus fully described my said invention what I claim as new and desire to secure by Letters Patent, is:—

1. A convertible wheeled toy comprising front and rear wheels and a scooter platform, a steering post having an upper portion adapted to swing about a horizontal axis, a wagon body pivotally and removably supported on the rear axle of the scooter, a bracket on the forward end of the wagon body and having means for holding the bracket and forward end of the wagon body supported thereon against lateral movement, and a detent on the scooter body adapted to engage said bracket and hold the wagon body in place, substantially as set forth.

2. A convertible wheeled toy comprising a scooter having a body and front and rear wheels, a steering post lowerable from an upright to a substantially horizontal position said steering post being mounted between forks and having extensions for engagement over the front and rear of the forks for maintaining the post in upright position but adapted to be moved longitudinally for disengagement with said forks to be swung to a lowered position, a dump body pivotally and removably supported adjacent the rear of the scooter body, a bracket adjacent the forward end of the dump body for engagement with the scooter body and having means for holding the same against sidewise movement, and means for holding said bracket in engagement with said scooter body, substantially as set forth.

In witness whereof, I have hereunto set my hand and seal at Indianapolis, Indiana, this 8th day of September A. D. nineteen hundred and twenty-four.

WILLIAM H. HERRICK. [L. S.]